United States Patent

Ishikawa et al.

[11] Patent Number: 5,829,783
[45] Date of Patent: Nov. 3, 1998

[54] AIR BAG APPARATUS

[75] Inventors: Masanobu Ishikawa, Nagoya; Kazunori Sakamoto, Nishi-michi; Yoshiyuki Ito, Anjo, all of Japan

[73] Assignee: Aisin Seiki Kabushiki Kaisha, Aichi-pref, Japan

[21] Appl. No.: 921,546

[22] Filed: Sep. 2, 1997

[30] Foreign Application Priority Data

Sep. 3, 1996 [JP] Japan ................................. 8-233298

[51] Int. Cl.$^6$ .................................................. B60R 21/26
[52] U.S. Cl. .......................... 280/736; 280/741; 280/742
[58] Field of Search .................................. 280/736, 741, 280/742, 740, 734, 739

[56] References Cited

U.S. PATENT DOCUMENTS 5,366,242 11/1994 Faigle et al. ............................. 280/736
5,388,860 2/1995 Brade et al. ......................... 280/736 X
5,695,214 12/1997 Faigle et al. ............................. 280/735
5,707,078 1/1998 Swanberg et al. ....................... 280/739

FOREIGN PATENT DOCUMENTS 4-228341 8/1992 Japan .
5085295 4/1993 Japan ..................................... 280/736

Primary Examiner—Christohper P. Ellis
Attorney, Agent, or Firm—Hazel & Thomas, P.C.

[57] ABSTRACT

The air bag apparatus has a pressure adjusting mechanism. The pressure adjusting mechanism controls a flow rate of the operating gas. When acceleration caused by a collision exceeds a predetermined level by a small level, the pressure adjusting mechanism releases the operating gas into the atmosphere. When the acceleration well exceeds the predetermined level, the pressure adjusting mechanism does not release the operating gas.

5 Claims, 6 Drawing Sheets

AIR BAG APPARATUS

BACKGROUND OF THE INVENTION

1. Field of the Invention

The present invention relates to an air bag apparatus for use in a supplemental restraint system of a vehicle and, more particularly, to an apparatus having a gas diffusion adjusting mechanism which controls a flow of gas during inflation of an air bag.

2. DESCRIPTION OF THE RELATED ART

An example of a conventional air bag apparatus for a vehicle is disclosed in Japanese Patent Laid-Open Publication No. 4-228341. The reference discloses an air bag apparatus which has a gas diffusion adjusting mechanism. The air bag apparatus has an inflator, an air bag and a pressure adjusting mechanism to control the internal pressure of the air bag. The pressure adjusting mechanism has a valve body (11) and a valve seat (6). A clearance (14) is established between the valve body (11) and the valve seat (6). The valve body (11) has a shaft portion (10) and a plurality of notches (12a, 12b, 12c) are provided on the outer periphery of the shaft portion (10). The shaft portion (10) engages with an outer casing (2) and maintains an initial position. When excessive acceleration is applied to the valve body (10), the valve body (10) slides against the regulation action of the notches (12a, 12b, 12c). The clearance (14) is controlled in response to the acceleration value. Consequently, the flow rate from the inflator to an air bag (4) is controlled in response to the clearance (4). If a momentary acceleration is applied (not a vehicle collision condition) to the valve body (11), the valve body (11) moves and clearance is reduced. However, the valve body (11) cannot return to the initial position.

SUMMARY OF THE INVENTION

As a consequence, a need exists for an improved air bag apparatus that is able to overcome the above drawbacks.

It is an object of the present invention to provide an air bag apparatus which can maintain the initial position of the pressure adjusting mechanism when excessive acceleration is applied under the condition that it is not needed to expand the air bag.

In order to achieve the above-mentioned objects, an air bag apparatus including a pressure control mechanism has a canister, an inflator that accumulates an operating gas, said inflator being arranged in said canister, an air bag that expands when said operating gas is supplied from said inflator through said canister, a pressure adjusting mechanism that adjusts the pressure value of said operating gas in said canister in response to an applied acceleration, a first opening hole formed in said canister that communicates with the internal portion of said pressure adjusting mechanism, a vent formed in said pressure adjusting mechanism, said vent communicating with the atmosphere, a weight that is provided in the pressure adjusting mechanism, said weight controlling said first opening hole opening, a second opening hole formed in said weight that establishes communication between said pressure adjusting mechanism and the atmosphere when said first and second opening holes are aligned, a spring arranged between said canister and said weight, said spring maintaining said weight in an initial position.

BRIEF DESCRIPTION OF THE DRAWINGS

Other objects, features and advantages of the present invention will be more readily appreciated from the following description of the preferred embodiments thereof when taken together with the accompanying drawings, in which.

DETAILED DESCRIPTION OF THE PREFERRED EMBODIMENT

Figure 1:
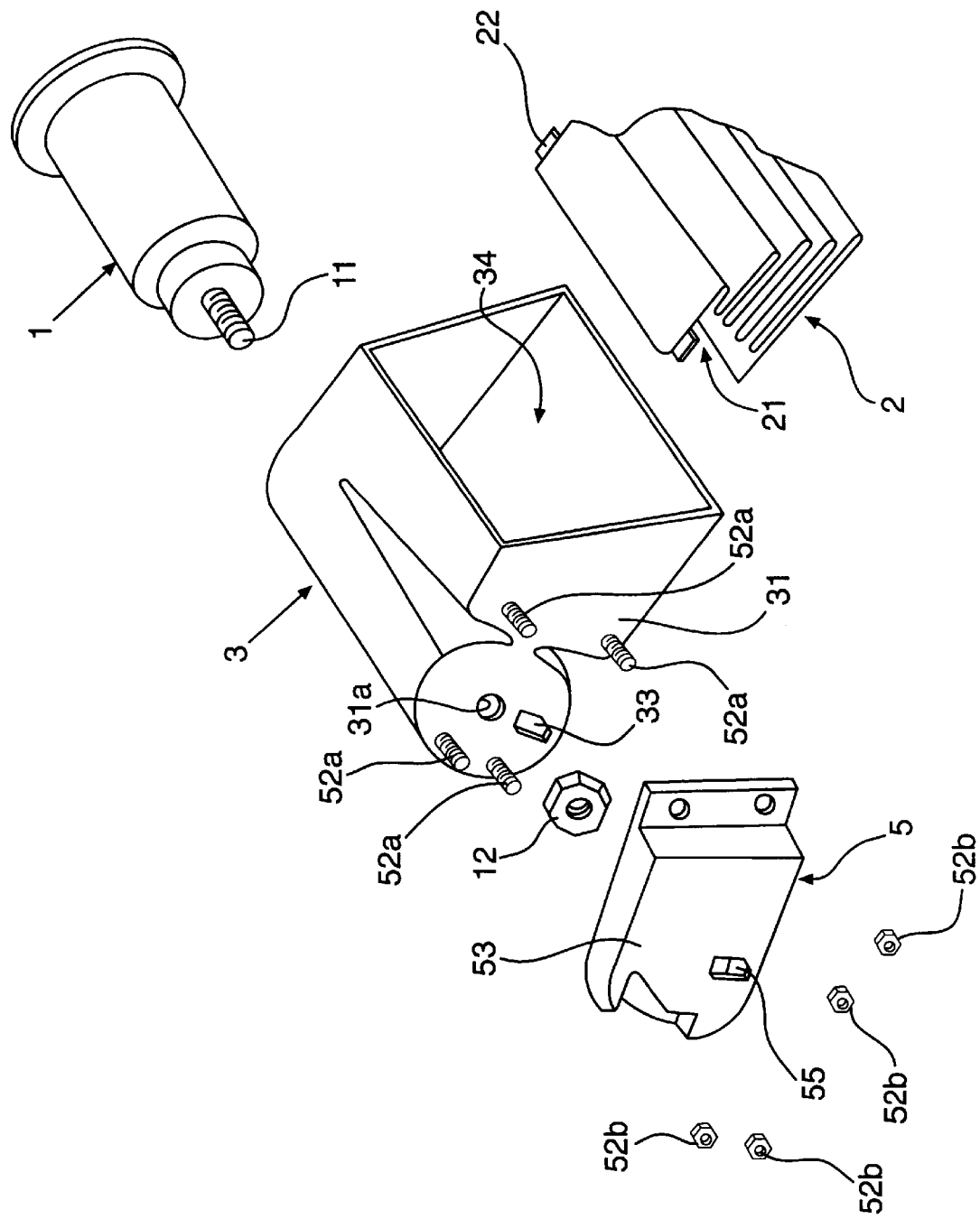
FIG. 1 is an exploded view in perspective of the air bag apparatus according to the present invention.
Figure 2:
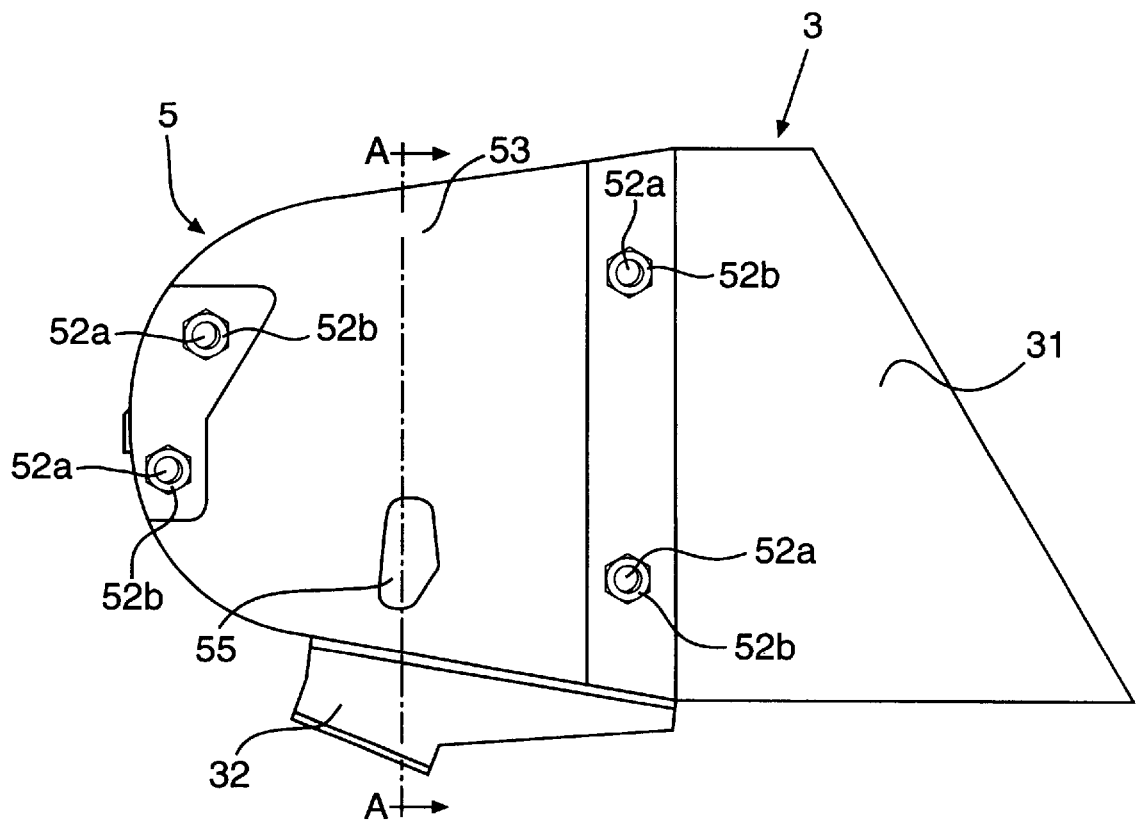
FIG. 2 is a side view of the air bag apparatus according to the present invention.

Referring to the drawings, preferred embodiments of the present invention will be explained in detail. FIG. 1 and FIG. 2 show an air bag apparatus illustrating features of the present invention. With reference to FIGS. 1 and 2, an inflator 1 accumulates an operating gas, has a cylindrical body and is accommodated in a canister housing 3. An air bag 2 is folded and contained in the canister 3. The canister 3 is shaped like a rectangular parallelpiped and has an opening 34. The canister 3 is fixed to the instrument panel (not shown) through a bracket 32 and the opening 34 faces the direction of the passenger's seat. The inflator 1 is arranged in the canister 3 and tightly held by a screw 11 and nut 12. The air bag 2 has an opening 21 that introduces the gas from the inflator 1. The air bag 2 is fixed to the canister 3 for maintaining the air-tightness by using a fastener 22. The plate shaped fastener 22 is fixed to the inner surface of the canister 3 by a plurality of bolts (not shown).

Figure 3:
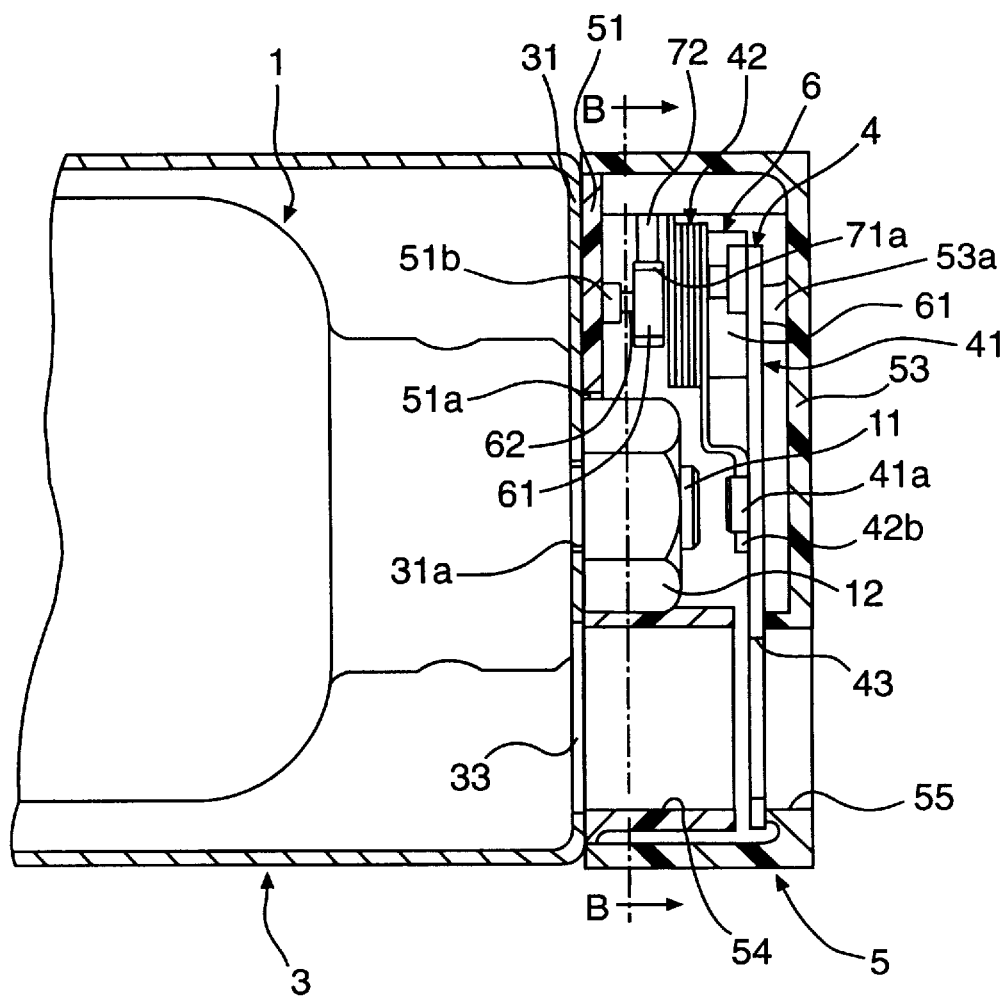
FIG. 3 is a cross-sectional view of the present invention taken along line A—A of FIG. 2.

With reference to FIGS. 1 through 3, a case 5, composed of a first case 51 and a second case 53, is mounted on a side wall 31 of the canister 3. The first case 51 is fitted on the surface of the side wall 31. There is disposed a plurality of welded bolts 52a on the side wall 31, and the case 5 is tightly secured to the canister 3 by the welded bolts 52a and nuts 52b. A pressure adjusting mechanism 4 is provided in the case 5. The first case 51 has a hole 51a which receives the nut 12.

Figure 4:
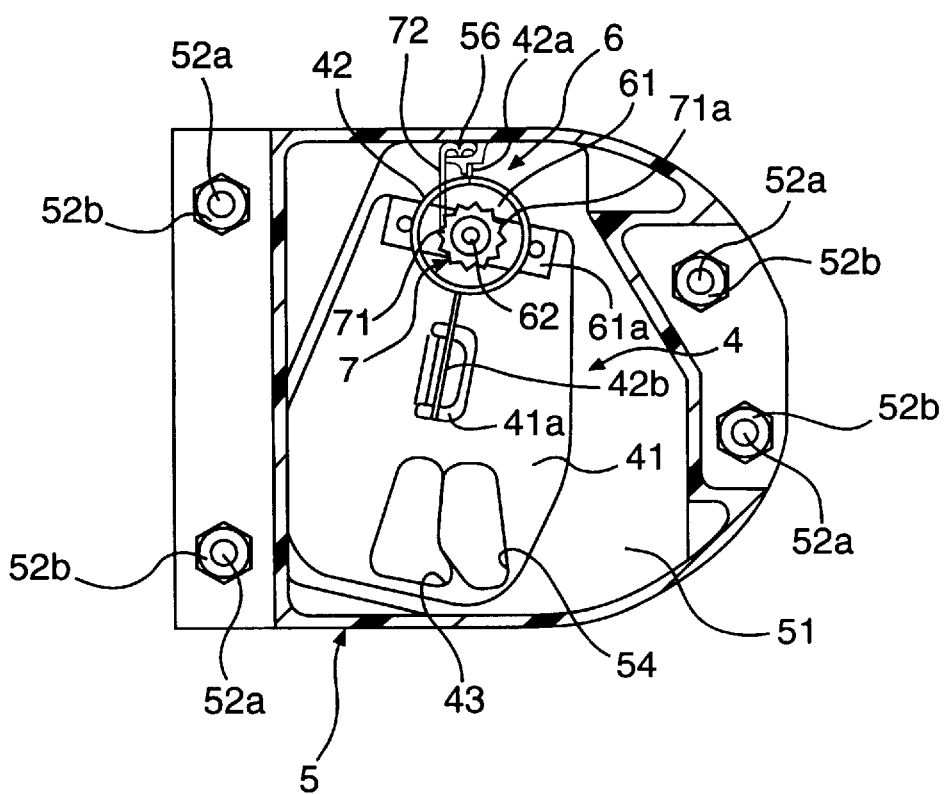
FIG. 4 is a cross-sectional view of the present invention taken along line B—B of FIG. 3 in an initial condition.

With reference to FIGS. 3 and 4, the pressure adjusting mechanism 4 has a plate shaped weight 41 and a spring 42. A projecting boss 53a is formed on the inner surface of the second case 53, and the weight 41 is rotatably arranged on the boss 53a. The weight 41 is in parallel with the first case 51. The spring 42 is arranged between the case 51 and the weight 41 under compression. One end of the spring 42 is engaged with an engaging portion 56. The engaging portion 56 is formed on the first case 51. The other end of the spring 42 is fixed to an engaging portion 41a of the weight 41. The weight 41 is pressed in the clockwise direction by force of the spring 42. As shown in FIG. 4, the weight 41 is fitted to the case 51 by the spring force in an initial position.

A vent 55, that communicates with the inside of the case 51, is formed in the second case 53 of the case 51. A first opening hole 33 is formed in the side wall 31 of the canister 3. A second opening hole 43 is formed in the weight 41. An air path 54 is formed in the first wall 51. When the weight 41 is rotated, the second opening hole 43 selectively aligns with the first opening hole 33 and the air path 54. When the first and second opening holes 33,43 face each other, the internal portion of the canister 3 communicates with the atmosphere. On the other hand, when the first opening hole 33 does not face the second opening hole 43, the internal portion of the canister 3 does not communicate with the atmosphere. The weight 41 functions as a shutter. The vent 55 has a convex portion 55a at the outer periphery of the second opening hole 43, and the convex portion 55a is fitted to the weight 41.

A damper mechanism 6 and a one way clutch 7 are mounted between the weight 41 and the case 51. The one way clutch 7 absorbs the operation of the damper mechanism 6. When the weight 41 rotates in the counterclockwise direction, the one way clutch 7 does not act on the damper mechanism 6. When the weight 41 rotates in the clockwise direction, the one way clutch 7 acts on the damper mechanism 6. A conventional damper mechanism 6 is adopted to this embodiment. The damper mechanism 6 is mounted on the axis of rotation. The damper mechanism 6 has a movable case 61 and a movable rotor. The movable case 61 is fastened to the weight by a bracket 61a. The one way clutch 7 has a latch plate 71 and a plate spring 72. The latch plate 71 is fixed to the axis of the damper mechanism 6 and it rotates together with the damper mechanism 6. The plate spring 72 is fixed to the case 51 at a fixed portion 56. The tip portion of the plate spring 72 is engaged with the teeth 71a of the latch plate 71. When the weight 41 turns counterclockwise, the one way clutch 7 and the damper mechanism 6 do not work. When the weight 41 turns clockwise, the one way clutch 7 and the damper mechanism 6 works. As a result, a damping force of the damper mechanism 6 is applied to the weight 41 and the weight 41 returns to the initial position receiving the damping force. The spring 42 is wound on the outer portion of the disk shaped movable case 61.

FIG. 4 shows a initial position of the pressure adjusting mechanism 4. The internal portion of the canister 31 does not communicate with the atmosphere because the weight 41 blocks the vent 55. In this condition, if the predetermined acceleration is applied to the controller, the inflator 1 operates. The operating gas from the inflator 1 is introduced into the canister 3 and the air bag 2. The air bag 2 expends and protects the passenger from the collision.

Figure 5:
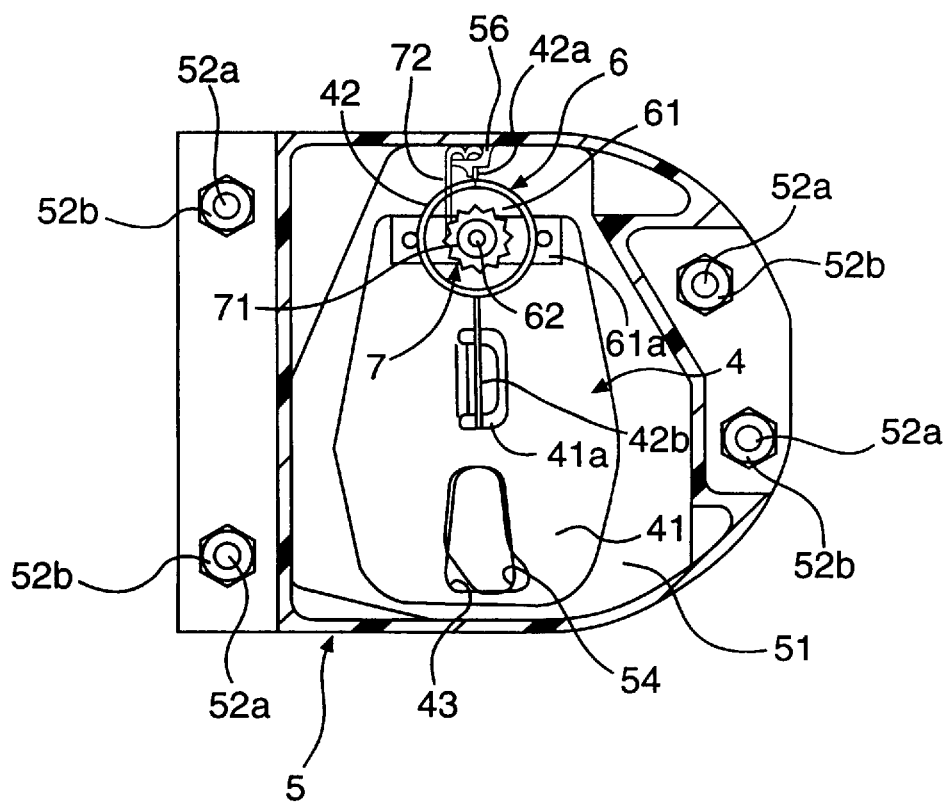
FIG. 5 is a cross-sectional view of the present invention taken along line B—B of FIG. 3 in an operating condition.
Figure 6:
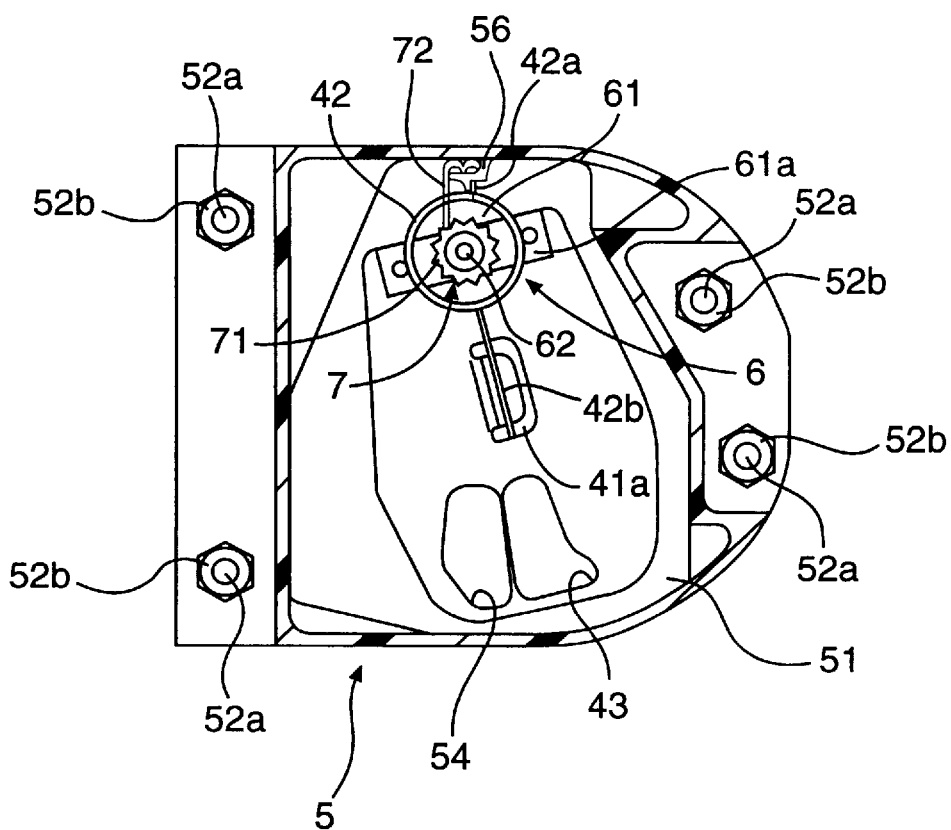
FIG. 6 is a cross-sectional view of the present invention taken along line B—B of the FIG. 3 in an idle condition.

When excess acceleration occurs, the weight 41 turns counterclockwise (shown in FIGS. 5 and 6). At that point, the damping force of the damper mechanism 6 is not applied to the weight 41. The excess acceleration is determined in accordance with the acceleration value and the continuance time.

The rotational degree of the weight 41 is determined according to the acceleration value. If the acceleration exceeds a predetermined value by a small amount, the weight 41 turns and the first opening hall 33, second opening hole 43 and the vent 55 align with each other (shown in FIG. 5). The internal portion of the canister 3 communicates with the atmosphere and the inflated gas in the canister 3 is exhausted. Consequently, the gas amount introduced into the air bag decreases and an internal pressure of the air bag is kept keeps low. If the acceleration exceeds the predetermined value beyond a certain level, the weight 41 turns and the weight 41 blocks up the vent 55 (shown in FIG. 6). The internal portion of the canister 3 does not communicate with the atmosphere and all of the inflated gas in the canister 3 is introduced into the air bag 2. Consequently, the internal pressure of the air bag is kept high.

When the weight 41 returns to the initial position, the weight 41 turns clockwise slowly receiving a damping force. The present invention controls the communication between the internal portion of the canister 3 and the atmosphere, the internal air pressure value of the canister 3 is proportionally controlled in response to the acceleration value. Therefore, the expected internal pressure is produced in response to the acceleration value.

The weight 41 turns in accordance with the applied acceleration whether the air bag operates or not. When the acceleration is canceled, the weight 41 returns to the initial position as shown in FIG. 4.

While the invention has been described in conjunction with one of its preferred embodiments, it should be understood that changes and modifications may be made without departing from the scope and spirit of the appended claims.

What is claimed is:

1. An air bag apparatus including a pressure control mechanism comprising:

a canister;

an inflator for accumulating an operating gas said inflator being arranged in said canister;

an air bag for expanding when said operating gas is supplied from said inflator through said canister;

a pressure adjusting mechanism for adjusting a pressure value of said operating gas in said canister in response to an applied acceleration;

a first opening hole formed in said canister, said first opening hole being defined to communicate with an internal portion of said pressure adjusting mechanism;

a vent formed in said pressure adjusting mechanism, said vent being defined to communicate with the atmosphere;

a weight provided in said pressure adjusting mechanism, said weight having means for controlling an opening of said first opening hole;

a second opening hole formed in said weight, said second opening hole being defined to communicate between said pressure adjusting mechanism and the atmosphere when said first and second opening holes are aligned; and a spring arranged between said canister and said weight, said spring being operatively positioned to maintain said weight in an initial position.

2. An air bag apparatus as set forth in claim 1, wherein said weight is rotatably mounted on said pressure adjusting mechanism and rotates in response to said applied acceleration.

3. An air bag apparatus as set forth in claim 1, wherein said canister has a first opening hole having the same shape as said second opening hole for establishing communication between an internal portion of said canister and the atmosphere.

4. An air bag apparatus as set forth in claim 1, wherein said pressure adjusting mechanism having a damper mechanism for applying a damping force when said weight turns to said initial position.

5. An air bag apparatus as set forth in claim 4, wherein said damper mechanism includes a one way clutch for regulating an operation of said weight.

* * * * *